July 18, 1950   R. P. C. RASMUSEN   2,515,264
WELDING APPARATUS
Filed Oct. 4, 1947   5 Sheets-Sheet 1

INVENTOR
Reidar P.C. Rasmusen
BY
M. Holbrook
ATTORNEY

July 18, 1950

R. P. C. RASMUSEN 2,515,264

WELDING APPARATUS

Filed Oct. 4, 1947

INVENTOR
Reidar P.C. Rasmusen
BY
W. Holbrook
ATTORNEY

July 18, 1950 R. P. C. RASMUSEN 2,515,264
WELDING APPARATUS
Filed Oct. 4, 1947 5 Sheets-Sheet 5

INVENTOR
Reidar P.C. Rasmusen
BY
M. Holbrook ATTORNEY

Patented July 18, 1950

2,515,264

UNITED STATES PATENT OFFICE 2,515,264

WELDING APPARATUS

Reidar P. C. Rasmusen, Akron, Ohio, assignor to The Babcock & Wilcox Company, Rockleigh, N. J., a corporation of New Jersey Application October 4, 1947, Serial No. 777,868

16 Claims. (Cl. 219—4)

This invention relates to alternating current electric welding machines and more particularly to a machine for resistance welding an alloy sheet to a thick steel base plate preparatory to fabricating a vessel with a corrosion resistant lining.

To effect such welding, the machine of this invention involves a plurality of rotatable welding units each including a welding roll with a transformer integrally associated therewith. With this machine the output of energy is transmitted to the work with a minimum of loss and the overall kv.-a. demand is reduced materially as compared with machines of the prior art using stationary transformers from which large secondary busses lead, to carry currents as high as 40,000 to 50,000 amperes. Such machines have had large secondary reactance losses and have involved low power factors.

In the machine of this invention two rotary transformers have their primaries connected in parallel to the same alternating current source by means of slip rings. The secondary of each transformer consists of a single turn about the primary, the secondaries being series connected. The primary of each transformer consists of a large number of pancake coils of four turns each, of square copper tubing. These coils are series connected to form the entire primary of each transformer.

The primary of each transformer of the machine is maintained within the desired temperature range by the flow of a coolant through the copper tubing which is arranged so that the coolant outlet of each primary is connected with a passage through the center of the transformer, making possible the cooling of the inner hub of the secondary. The casing, or the outside secondary of each transformer, is cooled by water discharged thereover. Rotatable with the transformers and disposed between them are two welding rolls between which the coolant discharges from the secondary hub to the welding zone.

Each transformer unit, with its welding roll, is supported by a separate vertical slide, welding pressure being transmitted to these mountings by means of separate pressure cylinders.

The welding machine has low reactance characteristics which operate to provide a more constant welding voltage, during welding operation. The machine also effects substantial power savings and permits higher current flow into the work for shorter periods. This is of material assistance in overcoming shunt current effects which tend to render the welding difficult.

The spaced rolling electrodes of the machine are supported from a traveling bridge, each electrode having its own air cylinder support. With this arrangement each electrode and the rotating parts carried therewith about the same axis of rotation can be adjusted to the same predetermined electrode-plate pressure condition, and the electrodes may have slight relative movements due, for example, to variations in the thickness of the alloy sheet.

High secondary or welding current is supplied to the electrodes by a pair of compact and symmetrical transformers which are provided with fluid cooling, and are mounted for rotation with the electrodes which they serve. Each transformer has its primary winding connected with its own pair of rotating slip rings and associated brushes connected to an alternating current supply which is controlled automatically. The transformer secondaries of a pair of transformers are connected in series in a circuit which involves the rotating electrodes, the metallic sheets and plates being welded, and symmetrically arranged flexible connectors rotating with the transformer and electrode assemblies. The arrangement involving the rotary transformers, each integral with its electrode, reduces the impedance in the secondary leads and improves the electrical characteristics of the system, while attaining the optimum welding current flow. The flexible connectors, while promoting such independent vertical displacement of the electrode-transformer assemblies as may be necessary to obtain proper electrode-plate pressures, are of such conformation, length, and arrangement that a minimum impedance is introduced into the welding circuit.

The machine involves a cooling system in which the cooling fluid, initially used for cooling the transformers, is further utilized for cooling the electrodes and the welding contact zone.

The arrangement of the components of the machine are such that the transformer weights and the magnetic fields set up by the flow of electric current are balanced with respect to the electrodes, facilitating uniformity of electrode pressure and promoting low weight.

Other characteristics of the machine of the invention will appear hereinafter in connection with the description of the preferred embodiment illustrated in the accompanying drawings.

Figure 1:
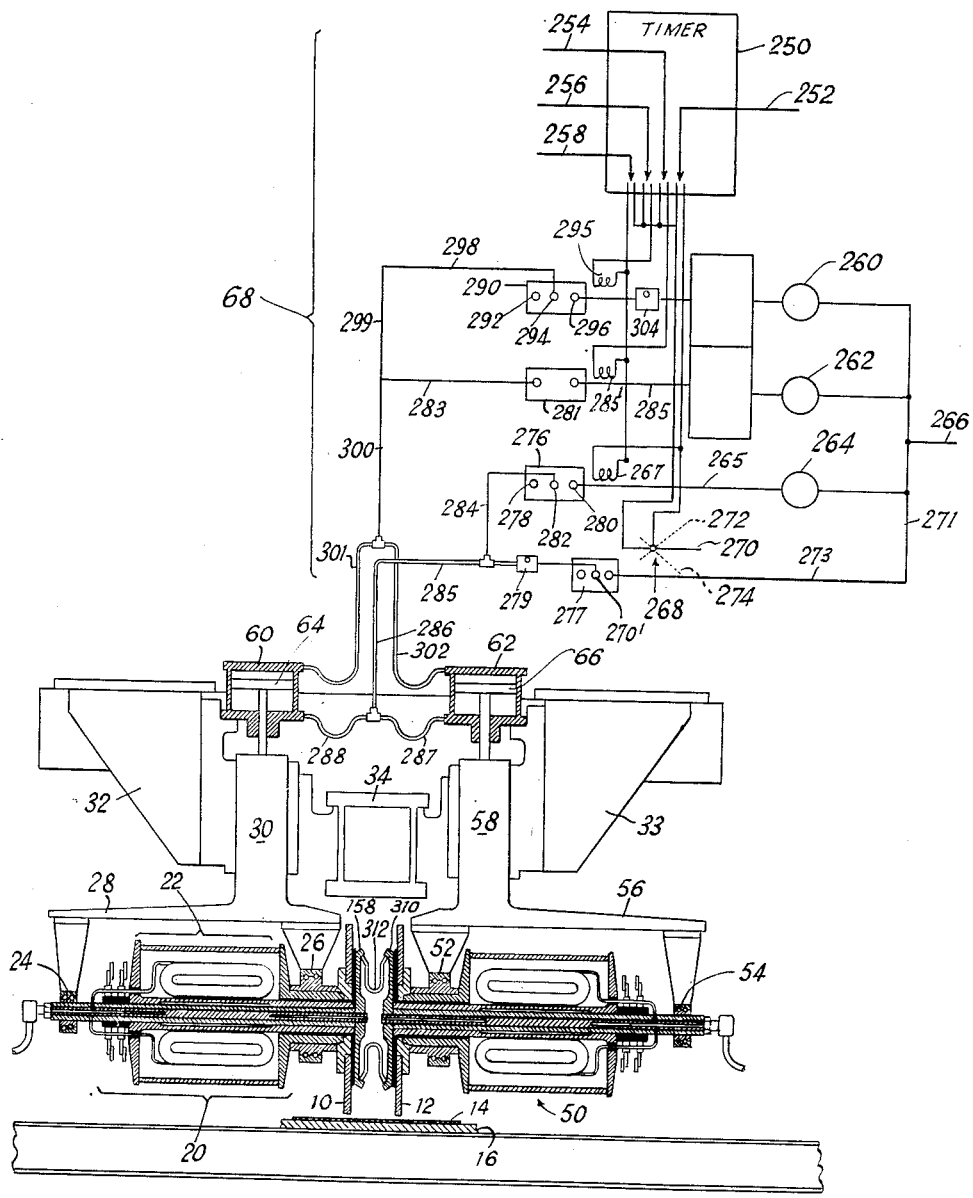
Fig. 1 is a partly diagrammatic view showing the welder in vertical section and the electrode pressure regulating and timing system.

The illustrative welder operates by the advance of the rotating electrodes 10 and 12 over the alloy steel sheet 14 to produce rows of overlapping spot welds bonding the alloy sheet to a thicker steel base plate 16. The electrodes 10 and 12 are electrically arranged as the terminals of a transformer secondary, and, in the formation of the welds, the current passes from the electrode 10 through the sheet 14, into the plate 16, and then through the plate to a position below the electrode 12, and thence out through the plate 16 and through the sheet 14 to the electrode 12, the supply of current being timed in electrical pulses, and the electrodes being simultaneously pressed against the work to produce spot welds, uniting the plate 16 and sheet 14.

Figure 2:
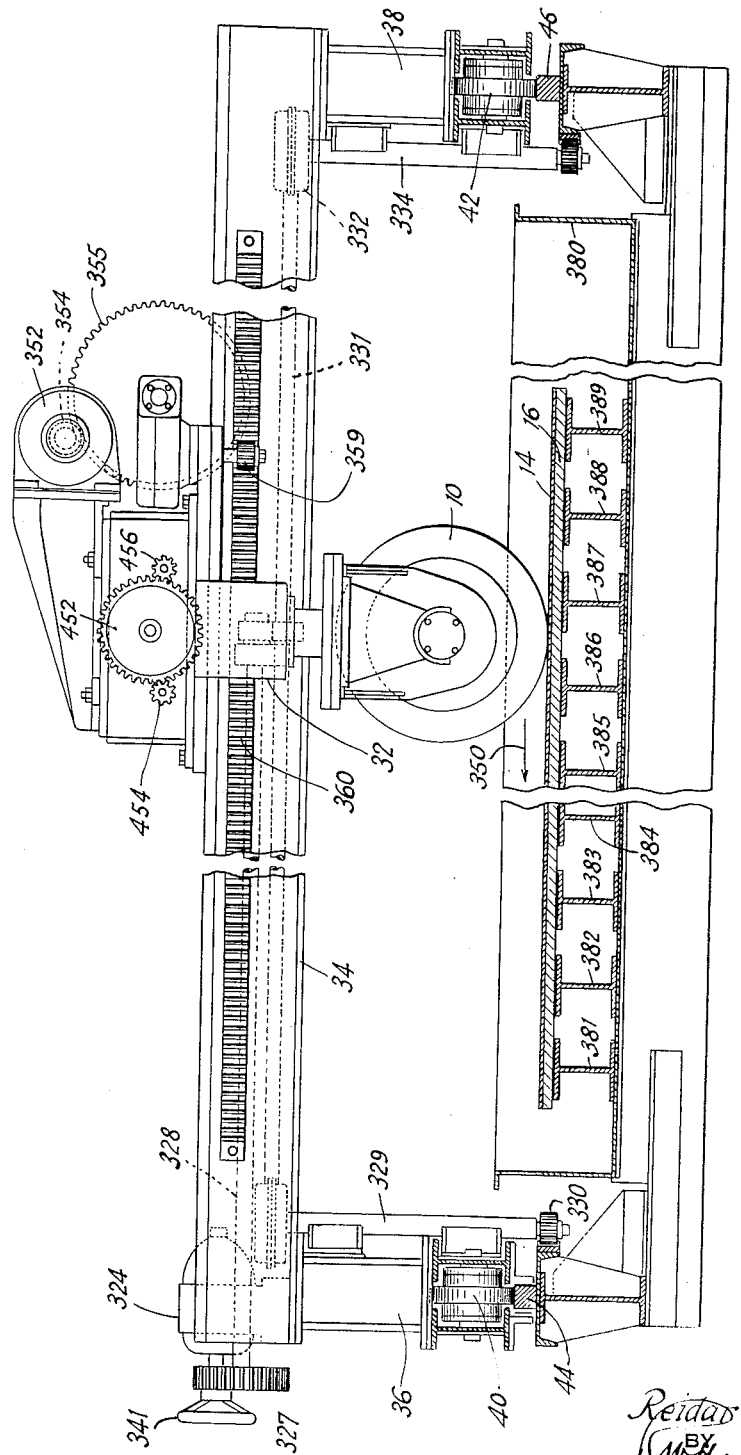
Fig. 2 is an end elevation view of the welder showing the work and the work support in vertical section.

The electrode 10 is a part of a rotating unit 20 including the transformer 22, this unit being supported for rotation in bearings 24 and 26 mounted in a frame 28 which is secured to the piston of an air cylinder 30. This cylinder is secured to a carriage 32 mounted for translational sliding movement along a bridge 34 extending over the work as indicated in Fig. 2 of the drawings. This bridge is supported by its end columns 36 and 38 which, in turn, are supported by rollers such as 40 and 42 for travel along the horizontal tracks 44 and 46.

The other rotating electrode 12 is similarly combined with the transformer 50 in a rotating unit mounted in the bearings 52 and 54 which are supported by a hanger frame 56. This frame is carried by the piston of an opposite vertical cylinder 58 mounted on the carriage 33 for vertical sliding movement and the application of electrode pressure.

The vertical movements of the transformer-electrode units 20 and 50 are produced by the pressure cylinders 60 and 62 and the pistons 64 and 66, controlled and operated by the pressure regulation system 68, which will be described below.

Figure 4:
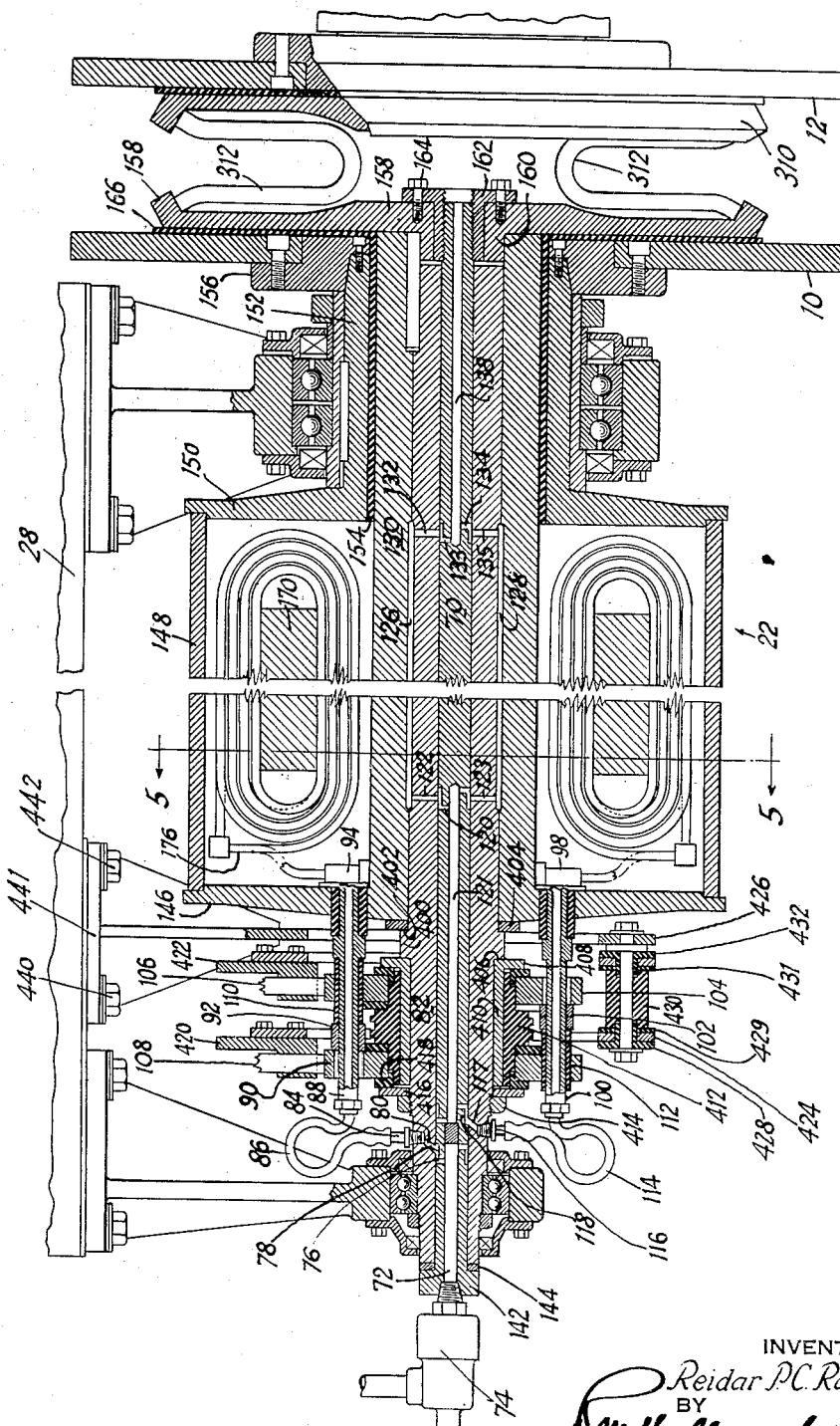
Fig. 4 is a longitudinal vertical sectional view through one of the electrode-transformer units.
Figure 8:
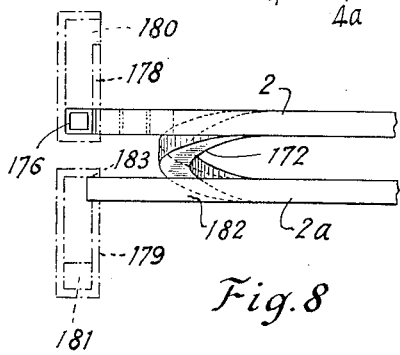
Figs. 6, 7, and 8 are detail views of a pair of coils for the transformer.

The combined electrode and transformer unit 20 is shown in detail in Figs. 4 and 8, inclusive. The central element of this unit is a stainless steel draw bar shaft 70. At its left hand end it is bored to provide a water inlet duct 72 through which water normally flows from an inlet connector 74, fixed to the shaft 70 in the manner shown. Toward the right hand end of the inlet duct 72, the shaft is provided with a radial passage 76 through which water flows to enter peripheral duct 78. Water flows from this duct through a radial duct 80 in the first hollow steel shaft 82, through connector 84, and then through an electrically non-conductive flexible hose 86 to the inlet of a tube 88. This tube is preferably of metal and in electrical conducting contact with the slip ring 90 through the sleeve 92. Thus, the tube 88 acts as an electrical terminal for the primary coils of the transformer and also as a water inlet for those coils. There are, in the illustrative unit, two of such connector tubes as that shown in Fig. 4 at 88.

The connector tube 88 is connected at its inner end to the box or header 94 and its companion connector is a similar construction, and connected to a box or header 96. These headers or boxes are indicated by dotted lines in Fig. 5 of the drawings.

Figure 5:
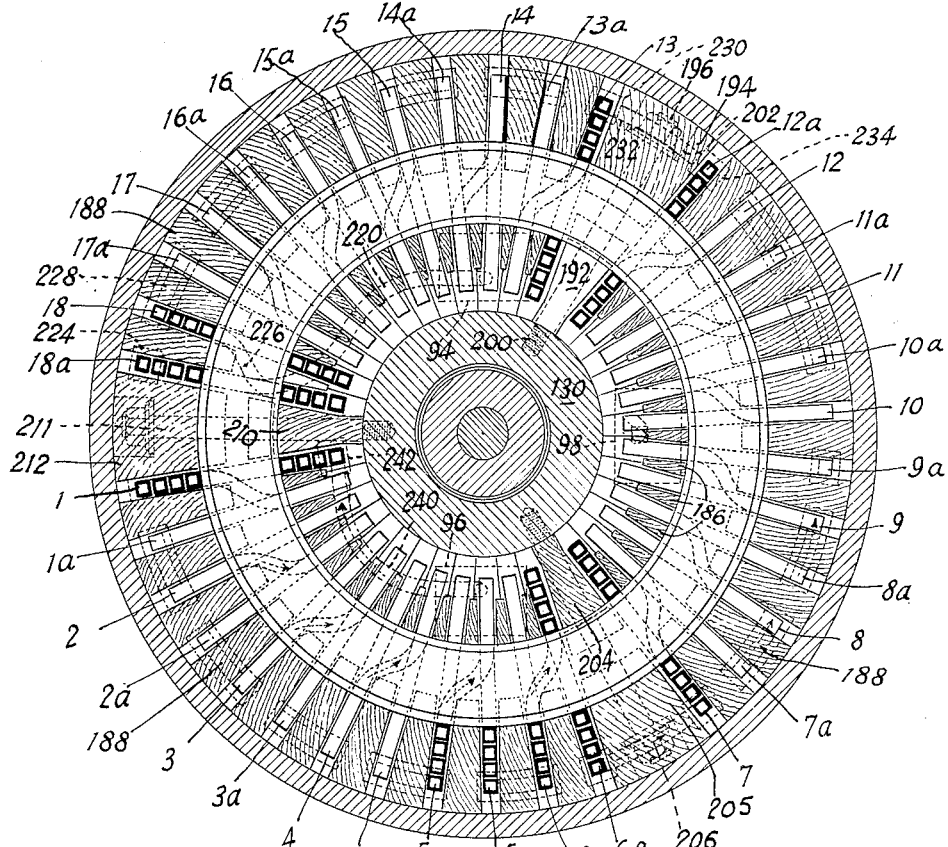
Fig. 5 is an enlarged transverse vertical sectional view through the transformer on the line 5—5 of Fig. 4.

From each of the headers 94 and 96 the water flows through the various coils of the transformer primary to an outlet header 98 shown on dotted lines at the middle right hand part of Fig. 5 and shown in elevation in the lower left hand part of Fig. 4. The header 98 is in communication with a metallic outlet connector 100 which also acts as an electrical terminal for the transformer primary through the metallic contact piece or sleeve 102. Through this electrical connection, the terminal of the transformer primary is connected to the slip ring 104 and thence by brushes 106 to a line terminal, the other primary terminal being connected by brushes 108 through the slip ring 90 to the other line terminal.

The first connector tube 88 is electrically insulated from the slip ring 104 by the insulating sleeve 110, and, conversely, the water outlet connector 100 is insulated from the slip ring 90 by the insulating sleeve 112. Water flows from the left hand end of the tubular connector 100 through the electrically non-conductive flexible hose 114, through a connector 116, screwthreaded into the first hollow shaft 82 so as to communicate with the duct 117 in the shaft 82 and thence through the ducts 118 and 121 formed in the central shaft 70 to a position within the coils of the primary. From that position, water flows outwardly of the shafts 70 and 82 through the radial ducts such as 122, and 123, and into an annular chamber such as indicated at 126 and 128. The latter is arranged so that the flow of cooling water is between the shaft 82 and the hollow metallic shaft part 130 of the transformer secondary, thus acting to cool the latter.

From the right hand end of the annular chamber 126—128, the cooling water flows inwardly radially through ducts such as 132—135 and thence through a connecting longitudinal bore 138 in the shaft 70. The right hand end of the duct 138 is open so that the water falls upon the alloy steel sheet 14 at the weld zone, or position of contact between electrode 10 and the work. This cooling effect upon the electrodes and the metal at the weld zone may be augmented by other streams of coolant directed toward the weld zone.

The central draw bar shaft 70, is an element upon which the remaining parts of the transformer and electrode unit may be said to be assembled. To facilitate this, the shaft 70 has an enlarged head 142 at its left hand end, and the hollow shaft 82 is telescoped over the shaft 70 and moved therealong until its left hand end comes into contact with the metallic washer 144 which, at its other side abuts against the head 142. Likewise, the tubular part 130 of the transformer secondary has a bore to give it a close sliding fit externally over the right hand part of the shaft 82. The part 130 is integral with the flange 146 to form the inner hub for the transformer secondary. The remainder of the secondary includes an annular copper member 148 which tightly contacts at one side with the periphery of the flange 146, and its other side, has similar contact with the periphery of a similar flange 150 of an external or right hand hub of the transformer secondary. This hub has a sleeve-like part 152 fitted over a sleeve 154 of electrical insulation which surrounds the sleeve 130 of the inner transformer hub. Thus, the secondary of the transformer is of the nature of a single coil and forms a casing for the transformer primary.

The electrode 10, an annular copper base alloy member, is secured to the end of the right hand end of the hub 152 by the collar 156 and its attaching bolts, to constitute one terminal of the transformer secondary. The other terminal of the transformer secondary for the unit 20 is formed by a copper disk 158 having a hub 160 secured to the right hand end of the shaft 70 by a collar 162 which is threaded upon the end of the shaft 70 as shown. Cap screws 164 secure the disk 158 in its operative position—wherein it is electrically insulated from the electrode 10 by the disk 166.

Within the annular casing formed by the transformer secondary are the pancake coils of the transformer primary. The primary embraces an annular laminated metal core 170 which is designed for operation at 80,000 lines per sq. inch. The high voltage winding is supported around the core, and it consists of pancake coils of four convolutions each, of square copper tubing. Each coil is series connected so that the primary consists of 144 turns. The successive coils are numbered consecutively in counter-clockwise sections 1 and 1a, 2, and 2a, etc. in Fig. 5, and the individual coils are wound in a clockwise direction. Successive convolutions of the coils are electrically insulated from each other.

Figures 6, 7:
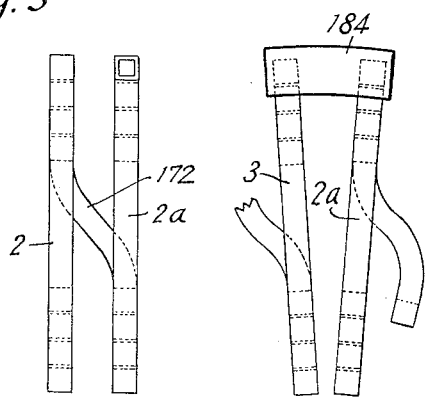

Before assembly of the transformer, the coils are formed in pairs as indicated in Figs. 6, 7, and 8. Fig. 6, for example, shows two coils such as 2 and 2a with the tubing for the inner convolution of coil 2 extending laterally out of the plane of the coil in an oblique connector 172 to the inner convolution of the coil 2a. The outside convolution of the coil 2 in Fig. 8 has an upright part 176 at its outer end disposed somewhat tangentially to the end of the next inner convolution for connection at the inner end of the crossover connector, or header 178, this connector having a lateral opening 180 for a horizontal part of the outside convolution of the next coil, i. e., 1a, similar to the part 182 of the coil 2a. The header connection of the coil 2a is through an extension 182 to a header 179 with its circulatory openings 181 and 183 set 90° apart and arranged reversely of the arrangement of openings in header 178. Fig. 7 indicates the manner in which successive coils such as 2a and 3 are joined by such a crossover connector as 184 in such a way that the planes of the coils converge inwardly toward the center of the transformer (as also indicated in Fig. 5).

The coils are assembled in two semi-circular segments, one of which, for example, includes the coils 13 and 13a to 3 and 3a, inclusive, with a similar semi-circular segment of the core 170 extending through the inner convolutions of the coils. Inwardly of this core segment, the successive coils are electrically insulated from each other, and uniformly circumferentially spaced by the tapered inner spacers 186. These spacers are preferably of hard wood. Similar hard wood spacers 188 insulate and circumferentially space successive coils exteriorly of the core 170.

A complementary second segment of the connected coils may be constructed in a manner similar to that above indicated, including the coils 4 and 4a (counter-clockwise) to 12 and 12a, inclusive, threaded over the other semi-circular core segment.

The spacer clamp blocks 192, 204 and 210 are then placed in position and the composite segments of core and primary are brought into operative position with the ends of the core segments in condition and position for good electrical contact. Stainless steel bands are then tightened around the core segments to hold them and the primary segments in operative positions. Then the outer hardwood spacer clamp blocks 194, 205 and 212 are secured in their operative positions by the bolts 196, 211 and 206 which extend through holes in the inner spacer clamp blocks and have their inner ends screw threaded into sockets in the hub sleeve 130 as indicated at 200. Nuts on the outer ends of these bolts are disposed in recesses, such as 202.

The above described hardwood coil spacers and spacer clamp blocks are preferably of substantially the same length as the coils and they have recesses in their outer edges for the reception of steel constricting bands which are circumferentially tightened to force all of the spacers and spacer clamp blocks inwardly to form the tight and compact transformer primary. These spacer and spacer clamp blocks are also tightened into the positions in which they are shown in Fig. 5 by the tightening of the bolts 196, 206, and 211. After this coil construction is completed in this manner, the cylindrical casing member 148 for the secondary is slipped over the outside spacers 188 to assume the position indicated.

The flow of cooling water through the coils of the transformer primary and the flow of the high voltage current may be traced from the same terminals. Accepting the header or box 94 (Fig. 4, and in the upper central part of Fig. 5 in dotted lines) as one of these terminals, this flow is from the header 94 through the tubular connector 220 (shown in full lines in Fig. 4, but in dotted lines in Fig. 5) to the short header 224. From that header the flow is inwardly through the successive convolutions of the coil 13a, to an oblique connector 226, to the inner convolution of the coil 13, and thence through successive outer convolutions of that coil to a crossover connector 228. From this crossover connector, the flow continues in a similar manner through the successive coils until it reaches the short header 230 near the outer spacer clamp block 194 (the upper right hand part of Fig. 5). From this header 230, the flow continues through the short tubular crossover connection 232 to a small header 234 and thence to the successive coils 12a, 12, 11a, 11, 10a, and 10 to the outlet header 98. Thence the flow of cooling water is traced through the tubular connector 100 to the flexible connector 114 to the outlet bore 138 of the draw bar shaft 70. The electric flow from the outlet header 98 is through the connector 100 to the slip ring 104 and thence to the line terminal 106.

The flow of cooling fluid and electricity from the other inlet terminal or header 96 (dotted lines; the lower central part of Fig. 5) is through the tubular connection 240 to the short inlet header 242 and thence through the successive coils 1, 1a to 9, 9a, inclusive, to the outlet header 98. This flow is indicated by the various arrows applied to the coils and the oblique crossover connections between the inlet header 96 and the outlet header 94.

The timing of the electrical pulses delivered to the transformer, and thereby to the work, may be effected by an appropriate electrical timing system. This system includes a timer known as the N. E. M. A. type 5-B timer. It is an automatic repeat timer, and is a standard product.

The pressure supply and control system 68 indicated in Fig. 1 of the drawings is correlated with the electrical timing system to supply a relatively low initial electrode-to-work pressure, such as 25 p. s. i., during the initial electrical pulse for each weld, and subsequently a higher pressure, for example, 37 p. s. i., during the second or final part of the formation of each spot weld when a much higher current (i. e. 350–500 primary amperes) is afforded through the operation of the electrical timing system. The pressure supply and timing system (Fig. 1) includes a timer at 250, reverse pressure relay at 252, a secondary pressure relay at 254, a primary pressure relay at 256, and a power supply circuit 258. It also includes, in the manner indicated, a low pressure compressed air regulator 260 and high pressure compressed air regulator 262, and reverse pressure air regulator 264. These regulators are connected, in the manner indicated, to an air supply line 266. A manual air control valve 277 has an operating lever 268, having a neutral position 270, an up position 272 and down position 274. The control system also includes a two-way valve 276 which is normally closed. It is operated through the energization of solenoid 267. With its connections, it operates to release the high pressure air from the electrode pressure cylinders 60 and 62, and then introduces a back pressure below the piston heads 64 and 66, which momentarily relieves all pressure on the work and substantially counterbalances the transformer-electrode assemblies and the parts vertically movable therewith. This valve has an exhaust connection 278, and in-connection 280, and an out-connection 282. The latter is connected by the lines 284—288 to the lower parts of the pressure cylinders 60 and 62.

A normally open valve 290 having an exhaust connection 292, an out-connection 294, and an in-connection 296 is connected by the lines 298—302, inclusive, to the upper ends of the pressure cylinders 60 and 62. This valve, with its connections, operates to transmit low air pressure, as regulated, from the line 260 to the upper parts of cylinders 60 and 62. A check valve 304 is disposed between the inlet connection 296 and the connections to the pressure regulator 260 to keep the high pressure from the line adjacent the regulator.

Immediately below the valve 290 is shown a high pressure valve 281 operated by solenoid 285', functioning to admit high pressure air to the electrode pressure cylinders from the regulator 262 for a predetermined time. This valve is controlled by the cool-time relay of the timer, and it is connected into the system by the compressed air lines 283, 285, 300, 301, and 302. The lines 301, 302, 287, and 288, have expansion loops therein, as shown, to permit the pistons 30 and 58 to be adjusted toward or from each other.

When the lever 268 is in its up position full line pressure flows through the line components 271 and 273, the valve 277, the check valve 279 and line components 285—288 to raise the electrode-transformer assemblies from operative range. The work may then be placed in position. When it is moved to the down position 274, it actuates a limit switch which, in turn, closes a circuit to energize solenoid 267 to open the exhaust port 278 of valve 276 to exhaust the back pressure from cylinders 60 and 62 and permit the operative cycle of the apparatus to start with the energization of solenoid 295 and the opening of port 296 to communicate low pressure through valve 290 and line components 298—302 to the upper ends of cylinders 60 and 62. To accomplish this, the line component 298 is placed in communication with the port 296 of valve 290.

While the low pressure is on the electrode-transformer assemblies, the electric timer applies the first pulse of electric current to the weld zones. There is a cool-time interval before the solenoid 285' operates the valve 281 to admit high pressure air from the regulator 262 to the upper parts of cylinders 60 and 62. Thereupon, the electric timer causes the second pulse of current to be applied through the electrodes to the weld zones.

Next, the exhaust port 292, of valve 290, opens to exhaust air from the upper ends of the cylinders 60 and 62, and then the solenoid 267 is energized to open the reverse pressure air line 266, 264, 280, 284, 285, 286, 287, 288 to the lower parts of cylinders to substantially counterbalance the weight of the transformer-electrode assemblies. This is automatically applied for a predetermined interval by the timing mechanism, and, upon the termination of that interval, the solenoid operates the valve 276 to exhaust the reverse pressure air through line components 284—288, and the above cycle of operations is repeated.

The right hand unit including the transformer 50 and the electrode 12 (Fig. 1) is constructed in a manner similar to that described in detail with reference to unit 20, and arranged in opposition thereto as indicated in Fig. 1 of the drawings. The secondary terminal disk 158 of the left hand unit is connected to the similar disk 310 of the other unit by the flexible connectors 312 so that the secondaries of the two transformers are connected in series while primaries of the transformers of the different units are connected in parallel through their own slip ring connections. There are 46 of these flexible connectors, each consisting of a length of insulated stranded cable, of copper or some similar good electrical conductor, and to provide for the association of these connectors with the disks 310 and 158, each of the latter is provided with a circumferential arrangement of holes. The sections of cables constituting the flexible connectors have good electrical connections with the disks 158 and 310 through these holes, each section of the connector being about 16" long, in order to provide for relative movements of the electrodes 10 and 12 and their transformer assemblies. Such movements are effected by adjustments of the assemblies so that the electrodes may be spaced, for example, within the range of 5" to 10". Such relative movements may be made without substantially shortening the loops or modifying the characteristics of the flexible connectors. With this arrangement of a circular series of flexible connections between the symmetrical secondaries of the transformer, the impedance of the secondary is maintained at a constant value irrespective of the rotative position of the electrodes, and the electrodes may still be slightly relatively movable in a vertical sense within such small ranges as are involved in the differences in plate and sheet thicknesses, and the electrodes can be advantageously individually held against the work by their respective air cylinders. Further, by providing a plurality of circumferentially spaced flexible connectors, they have the advantage from a mechanical standpoint that the individual connectors can be made of comparatively small diameter material, while collectively maintaining an optimum conductive capacity. With this arrangement, there is no unbalanced concentration of force as can be exerted by a single large flexible connector.

All elements, transformers, secondary leads, electrodes, etc., of the illustrative machine are symmetrically arranged with respect to the planes of the electrodes and the axis of rotation from both the electrical and mechanical standpoint.

Figure 3:
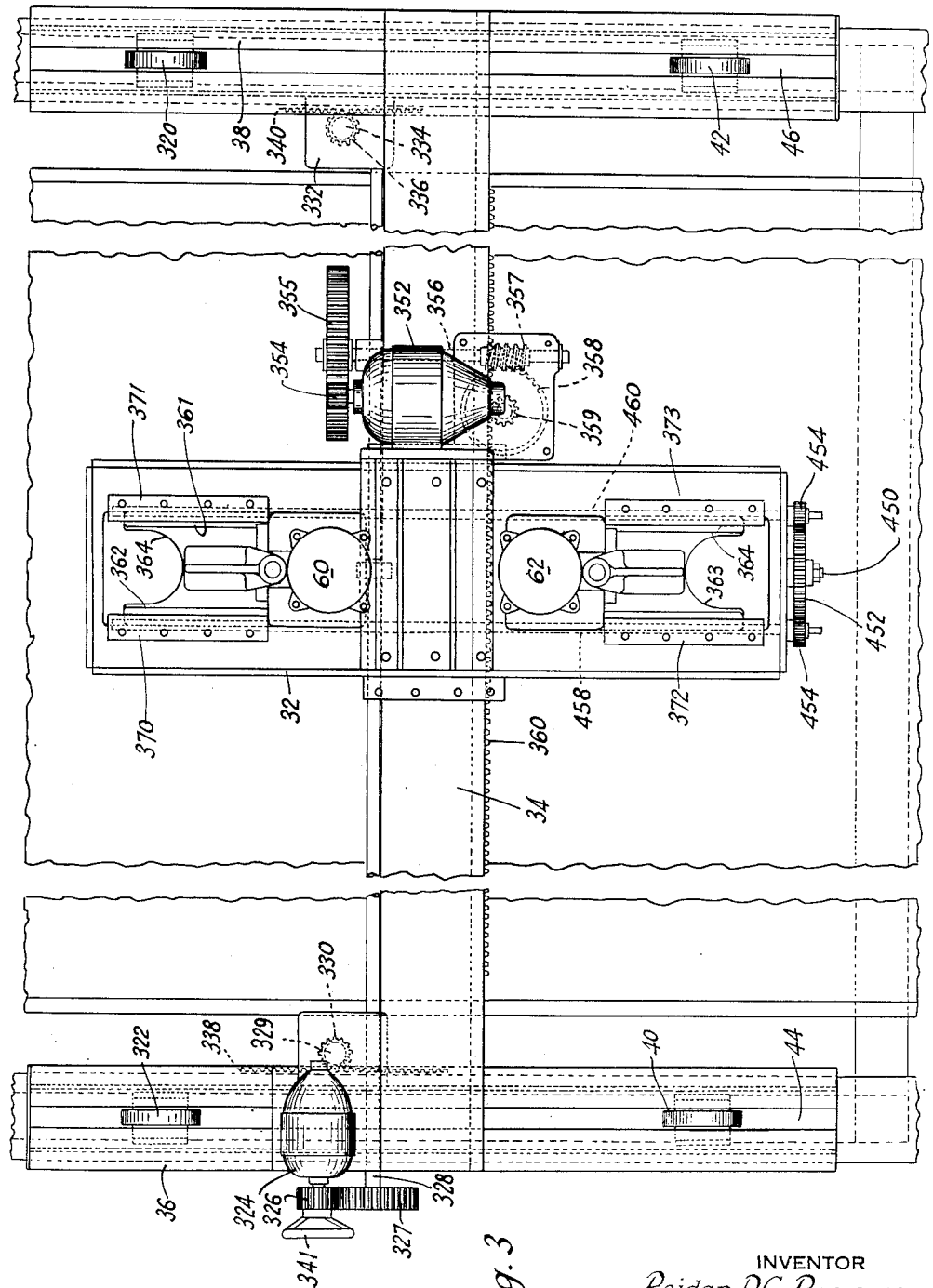
Fig. 3 is a plan view of the welder and its carriage.

Fig. 3 shows the arrangement of the carriage 32 on the bridge 34, and, together with Fig. 2 it also indicates the arrangement of the side supports 36 and 38 which are mounted upon the rollers 42, 40, 320 and 322 for bridge travel along the rails 44 and 46. Such travel is effected by the action of the motor 324 with its gearing and shaft connections 326—336, inclusive, co-acting with the stationary racks 338 and 340 which are fixed with reference to the rails 44 and 46, respectively. A finer manual adjustment of movement of this type may be effected by the use of the hand wheel 341, fixed relative to the pinion 326. This movement is in a direction at right angles to that of the movement of the electrodes and the direction of the lines of welds resulting from electrode movement.

The translational movement of the bridge to move the pair of electrodes progressively across the work in the direction indicated by the arrow 350 in Fig. 2 is effected by the motor 352 through its gearing and shaft connections 354—359 in co-operation with the rack 360 secured to the side of the cross beam structure 34 in a position indicated in Figs. 2 and 3.

The distance between the respective electrodes 10 and 12 may be adjusted by the sliding movement of the slide supports 361—364 between the parallel guides 370—373 of the carriage (Fig. 3). This adjustment of both pendant slides or pistons 30 and 58 being simultaneously accomplished through a wrench on the hub 450 of gear 452, which meshes with spur gears 454 and 456 driving adjusting screws 458 and 460 journalled in the bridge 22 and having screw-threaded connection with parts fixed to the slides such as 364 and 363 movable with the transformer and electrode units. For example, the adjusting screw 458 has such a connection to move the assembly 20 and the other screw has a like connection to move the other assembly including the transformer 50 and the electrode 12.

Fig. 2 shows a tank or pan 380 for receiving the overflow of cooling fluid from the welder, the work including the base plate 16 and the alloy sheet 14 being supported in this pan upon structural members such as 381—389, inclusive.

As indicated in Fig. 4 of the drawings, the hollow shaft 82 has a section 400 of increased diameter. This forms a shoulder 402 on its right hand side to act, through the spacer 404, as a stop for the sliding movement of the hub sleeve 130 along the hollow shaft 82 in assembly of the welder. At the other side of this section of increased diameter, there is a shoulder 406 against which abuts the flange 408 of a steel sleeve having a cylindrical portion 410. Upon this portion is secured the insulating sleeve 412 having recesses therein for receiving and supporting the slip rings 90 and 104. These parts are held in position by a nut 414 which is threaded upon the hollow shaft 82, with spacers 416 and 418 interposed, as indicated in the drawing.

The brushes 106 and 108 are held within brush holders 420 and 422 which, in turn, are connected to fixed uprights 424 and 426. These uprights are secured together, but insulated from each other by the insulating elements 428—432. The upright 426 is fixed to the frame by the elements 440—442 as indicated in the upper left hand part of Fig. 4.

What is claimed is:

1. In a resistance welding machine, a pair of electrically insulated rolling electrodes for contacting with the work on the same side thereof, said electrodes being mounted for rotational traverse of the work along parallel lines, a separate transformer for each electrode, each transformer with its electrode forming a closely coupled and integral unit with the electrode constituting a terminal of the secondary circuit, means mounting said units for independent vertical movements, and flexible leads connecting the secondaries of said units and constituting part of the secondary circuit for the pair of units and operatively disposed between said electrodes.

2. In a clad plate welding machine, a plurality of adjacent rotating units each including a closely coupled transformer and a rolling electrode, the transformer being axially symmetrical with its electrode arranged in non-rotative relation thereto, means for supporting said units in adjacent positions with the electrodes adjacent and facing each other, means including said supporting means for giving said units vertical movements and translatory movements relative to the work, and means connecting the secondaries of said units in series and including flexible leads disposed between said electrodes.

3. In welding apparatus, two closely associated units each including a circular electrode closely coupled with a transformer for rotation in unison, a work support, a carriage spanning the work and supported for translatory movement over and across the work, individual vertical slides for said separate units, individual electrode pressure cylinders for vertically moving said slides and the attached units to maintain the latter in operative relation to the work, means for supplying electric current to the primaries of said combined transformer and electrode units, and means between said adjacent electrodes connecting the secondaries of the said units in series.

4. In a clad plate welding machine, two adjacent rotating units each involving a closely coupled transformer and a rolling electrode, the transformer in such unit being axially symmetrical with its electrode and arranged in non-rotative relation therewith, means for supporting said units in adjacent positions for rotational advance across the work in unison, means connecting the secondaries of said units in series and including flexible leads disposed between said electrodes, and electrical circuits connecting the primaries of the transformers to a source of electric current for the timed multiple pulse flow of electricity through the transformers to the electrodes to form lines of overlapping spot welds in the work as the electrodes advance.

5. In a clad plate welding machine, two adjacent rotating units each involving a closely coupled transformer and a rolling electrode, the transformer being axially symmetrical with its electrode and arranged in non-rotative relation therewith, means for supporting said units in adjacent positions for rotational advance across the work in unison, means connecting the secondaries of said units in series and including flexible leads disposed between said electrodes, said leads permitting relative movements of said units, electrode pressure applying mechanism, electrical circuits connecting the primaries of the transformers to a source of electricity for the timed pulse welding of the work beneath each electrode, and an electrode pressure timing system correlating the electrode pressure application with the pulse transmission of welding current through the electrodes to the work.

6. In a welding machine, two rotatable electrodes supported and operated for rotational advance over the work to be welded, each electrode having a rotary transformer constructed as a unit therewith and each transformer including a primary winding and a secondary winding, flexible connectors joining the secondaries of the transformers in series, the electrodes forming the terminals of the connected secondary windings, the secondary winding of each transformer including a circular casing acting as a single turn secondary winding and forming an annular chamber, an annular core within said chamber, the primary winding of each transformer comprising fluid cooled hollow conductor coil sections around said core and within the chamber, said primary coil sections forming serially connected sections of cooling fluid flow channels extending through each electrode and discharging cooling fluid toward the work at a position between the electrodes and means including electrical circuits energizing the transformer primaries.

7. In a resistance welding machine, a pair of electrically insulated rolling electrodes for contacting with the work on the same side thereof, said electrodes being mounted for rotational traverse of the work along adjacent parallel lines, a separate rotatable transformer for each electrode, each transformer with its co-axial electrode constituting a closely coupled and integral unit with the electrode constituting a terminal of the secondary circuit of the transformer, means including separate vertical slides mounting said units for independent vertical movements, and flexible leads connecting the secondaries of the transformers in series and disposed between said electrodes.

8. In a resistance welding system, spaced resistance welding electrodes, a transformer for each electrode, means independently energizing the primary of each of such transformers, and means including short flexible connectors interposed in the secondary circuit in which the secondaries of the transformers are connected in series.

9. In an electric resistance welding machine, a rotating electrode, a fluid cooled transformer unitarily associated with the electrode and including a primary winding and a secondary winding, the primary winding comprising hollow conductor coil sections and the electrode forming a terminal of the secondary winding, the primary winding coil sections forming serially connected sections of a cooling fluid flow channel extending through the electrode and discharging cooling fluid toward the work at a position adjacent the electrode, and means including electrical circuits energizing the primary winding.

10. In a clad plate welding machine, two laterally spaced and separately adjustable electrode rolls, two rotatable transformers each integrally mounted for rotation with a separate one of the electrodes, and a secondary circuit including the secondary of each of the transformers as well as work and both of the electrodes, said secondary circuit including a plurality of circumferentially spaced flexible current conductors arranged about the axis of rotation of the electrodes.

11. In an electrical resistance welding machine, laterally spaced and separately adjustable electrode rolls, a transformer integrally constructed with one of the electrodes and mounted for rotation therewith, and a transformer secondary circuit including both electrodes, said secondary circuit including a plurality of circumferentially spaced flexible current conductors arranged about the axis of rotation of both the electrodes and operating to permit the electrodes to have relative vertical movements during the operation of the transformers.

12. In an electrical resistance welding machine, laterally spaced and separately adjustable electrode rolls, each of the electrodes having a transformer integral therewith, and a transformer secondary circuit including both electrodes and the secondaries of both transformers, said secondary circuit including a plurality of circumferentially spaced flexible current conductors arranged about the axis of rotation of both the electrodes and operating to permit the electrodes to have relative vertical movements during the operation of the transformers.

13. In a resistance welding machine, two spaced rolling electrodes each having its own unitary transformer rotating therewith, means mounting the electrodes for relative movements as they advance across the work, said means including a separate fluid pressure mechanism for each unitary assembly of electrode and transformer, separate means supplying electric current to the primary of each transformer, and means including a constant power factor circuit connecting the electrodes and the transformer secondaries in series.

14. In an electric welding machine, two rotating assemblies each including a rotating electrode and a unitary transformer symmetrical therewith, means mounting said assemblies front-to-front with the electrodes disposed between the transformers and facing each other, and means including constant power factor connections in an axially symmetrical arrangement between the electrodes for connecting the transformers and the electrodes in series.

15. In an electric welding machine, two mechanically independent rotatable assemblies each including a transformer integrally associated with a welding electrode, the transformer secondary of each assembly acting as a pressure transmitting support for its associated electrode, and means connecting the transformer secondaries and the electrodes in series.

16. In a resistance welding machine, a pair of electrically insulated rolling disk electrodes for contacting with the work on the same side thereof, said electrodes being mounted independently of each other for rotation along parallel lines across the work, a separate transformer for each transformer with its electrode constituting a closely coupled unit with its electrode constituting a part of the transformer secondary circuit, means for rotatably supporting each of said units for rolling traverse of the electrode over the work and for relative movements, the electrode disks of the two units facing each other and disposed between the transformers, and fluid cooling means presenting a fluid flow channel incorporated in a unit and discharging cooling fluid toward the work at a position between the electrodes.

REIDAR P. C. RASMUSEN.

REFERENCES CITED

The following references are of record in the file of this patent:

UNITED STATES PATENTS

| Number | Name | Date |
| --- | --- | --- |
| 1,394,901 | Hobart | Oct. 25, 1921 |
| 1,728,812 | Tobey | Sept. 17, 1929 |
| 1,862,642 | Von Henke | June 14, 1932 |
| 1,916,218 | Hunter | July 4, 1933 |
| 2,132,196 | Von Henke | Oct. 4, 1938 |
| 2,214,002 | Trainer et al. | Sept. 10, 1940 |